United States Patent [19]

Laurin

[11] Patent Number: 4,485,064

[45] Date of Patent: Nov. 27, 1984

[54] ANTIBACTERIAL SEAL

[75] Inventor: Dean Laurin, Lake Zurich, Ill.

[73] Assignee: Baxter Travenol Laboratories, Inc., Deerfield, Ill.

[21] Appl. No.: 366,022

[22] Filed: Apr. 6, 1982

[51] Int. Cl.$^3$ .......................... B29D 3/00; B65D 81/24

[52] U.S. Cl. .................................... 264/242; 215/317; 220/87; 220/256; 220/257; 264/263; 264/264; 422/29; 422/36; 422/37; 422/40; 422/41

[58] Field of Search ........................ 264/242, 264, 263; 215/317; 220/87, 256, 257; 422/29, 36, 37, 40, 41

[56] References Cited

U.S. PATENT DOCUMENTS

| | | | |
|---|---|---|---|
| 1,490,314 | 4/1924 | Callahan | 220/87 |
| 2,347,737 | 5/1944 | Fuller | 18/47.5 |
| 2,798,636 | 7/1957 | Ketchledge | 220/87 |
| 2,871,091 | 1/1959 | Passedouet | 422/29 |
| 2,927,052 | 1/1960 | Moudry | 422/22 |
| 2,987,435 | 1/1961 | Davies | 422/37 |
| 3,140,329 | 7/1964 | Nutting | 264/242 |
| 3,191,655 | 6/1965 | McCord | 152/427 |
| 3,214,504 | 10/1965 | Gemberling | 264/242 |
| 3,260,777 | 7/1966 | Brandt | 264/262 |
| 3,286,010 | 11/1966 | van Groningen | 264/242 |
| 3,597,793 | 8/1971 | Weiler et al. | 18/5 BF |
| 3,699,198 | 10/1972 | Robinson | 264/96 |
| 3,776,996 | 12/1973 | Cameron et al. | 264/242 |
| 3,907,687 | 9/1975 | Hoeltzenbein | 210/321 |
| 3,966,869 | 6/1976 | Kohl | 264/242 |
| 4,021,524 | 5/1977 | Grimsley | 264/242 |
| 4,050,576 | 9/1977 | Williams et al. | 422/36 |
| 4,156,490 | 5/1979 | Peraboni | 215/252 |
| 4,176,755 | 12/1979 | Winchell | 215/32 |
| 4,210,618 | 7/1980 | Piltz et al. | 264/130 |
| 4,254,884 | 3/1981 | Maruyama | 215/232 |
| 4,278,548 | 7/1981 | Bettinger et al. | 422/37 |

*Primary Examiner*—James Derrington
*Attorney, Agent, or Firm*—Garrettson Ellis; Paul Flattery; Thomas A. Kmiotek

[57] ABSTRACT

Containers used for storing and dispensing liquids for medical applications include a closure, and medical connection device include cooperating connector members. An article of manufacture and a method are provided where a plastic outer closure is applied over container closures or over connection devices. The application of the plastic outer closure exerts an antibacterial effect in the juncture area defined by the interface of the outer closure and the container inner closure and neck, or defined by the interface of the outer closure and the connection site of the connector members. The outer closure is of a type of plastic that releases an antibacterial agent, which exerts an antibacterial effect in the juncture area.

17 Claims, 3 Drawing Figures

ANTIBACTERIAL SEAL

FIELD OF THE INVENTION

The invention relates generally to an outer closure to seal an inner closure of a container. It particularly relates to applying a plastic outer closure over an inner closure to define a juncture or interface area. Release of an antibacterial agent from the plastic outer closure exerts an antibacterial effect at the juncture area.

BACKGROUND OF THE INVENTION

The formation of a sealed area with a low bio-burden or sterile characteristic on the outside of and adjacent the closure of a container is desirable in a number of medical applications. A seal exerting an antibacterial effect outside of and at the neck and closure portion of containers for medical fluids would be desirable as one step in minimizing contamination of the medical fluid when the contents are removed, for example by pouring, thereby decreasing the risk of infection to patients. Also, it would be desirable to provide antibacterial seals to the outside of a closure and neck on pharmaceutical vials containing liquids or solids, to allow preparation of antibacterial injection sites for access to the pharmaceuticals contained therein, for mixture with other medical solutions. Such antibacterial sealing of the outside of medical connection devices having cooperating connector members could reduce the possible contamination of fluids carried therebetween.

By this invention, a method is provided for forming an antibacterial seal on the outside of a medical fluid container, typically at the neck and closure of the container. In addition, the seal can function as an outer closure, protecting the inner closure from damage. Also by this invention the closure and container neck of pharmaceutical vials may be sealed by an outer closure to provide a sterile or low bio-burden area at the interface of the outer closure and the pharmaceutical vial neck and closure, thus providing an uncontaminated site for access to the pharmaceutical contained therein. Also, by using an antibacterial seal for placement over the outside of medical connection devices having cooperating connector members, the risk of contamination to the connection and subsequent contamination to the fluids passing therebetween can be minimized by the antibacterial effect of the seal.

BRIEF SUMMARY OF THE INVENTION

The present invention provides for the application of a plastic outer closure to containers or over connection devices, whereby the application of the plastic outer closure exerts an antibacterial effect in the juncture area defined by the interface of the outer closure and the container inner closure and neck, or defined by the interface of the outer closure and the connection site of the connector members. The method involves applying a plastic outer closure to a container having an inner closure to define a juncture area between the inner and outer closure. In accordance with this invention, the outer closure is of a type of plastic that releases an antibacterial agent, whereby an antibacterial effect is exerted in the juncture area.

The container may be filled with a sterile fluid, for example, water, saline solution or one of a myriad of other medical fluids, or liquid or powdered pharmaceuticals. After the container is capped by an inner closure, with the inner closure providing for the sterility of the contents, the plastic outer closure may be applied to define a juncture area which includes the interface of the inner closure with the outer closure, whereby an antibacterial agent is released from the plastic outer closure, exerting the antibacterial effect at the juncture area. A similar antibacterial effect can also be achieved at the juncture area of medical connection devices and a plastic outer closure covering the connection devices.

The outer closure may be made of plastic sealingly incompatible with the inner closure to avoid adhesion, and the outer closure may form an overmold surrounding the inner closure, preferably forming a sterile area therebetween by the release of an antibacterial agent from the overmolded plastic outer closure.

The plastic outer closure material may have an antiseptic in its formulation, or it may be of the type of plastic that releases a bacteriocidal agent, for example.

BRIEF DESCRIPTION OF THE DRAWINGS

For a more complete understanding of this invention reference should now be had to the embodiment illustrated in greater detail in the accompanying drawings.

In the drawings.

DESCRIPTION OF THE PREFERRED EMBODIMENTS

Turning now to the drawings, one specific example of this invention is shown, but it is contemplated that this invention can be used in any situation where a molded outer closure covers an inner closure or connector.

Figure 1:
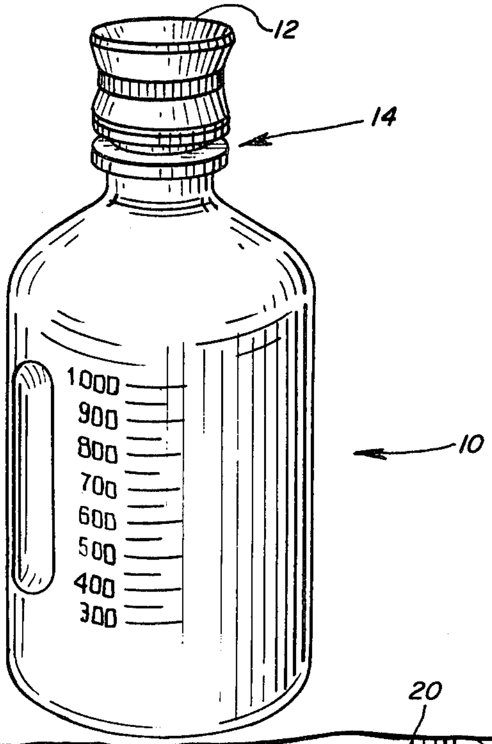
FIG. 1 is a perspective view of a pour bottle with a portion of the neck covered and sealed by the antibacterial outer closure.
Figure 2:
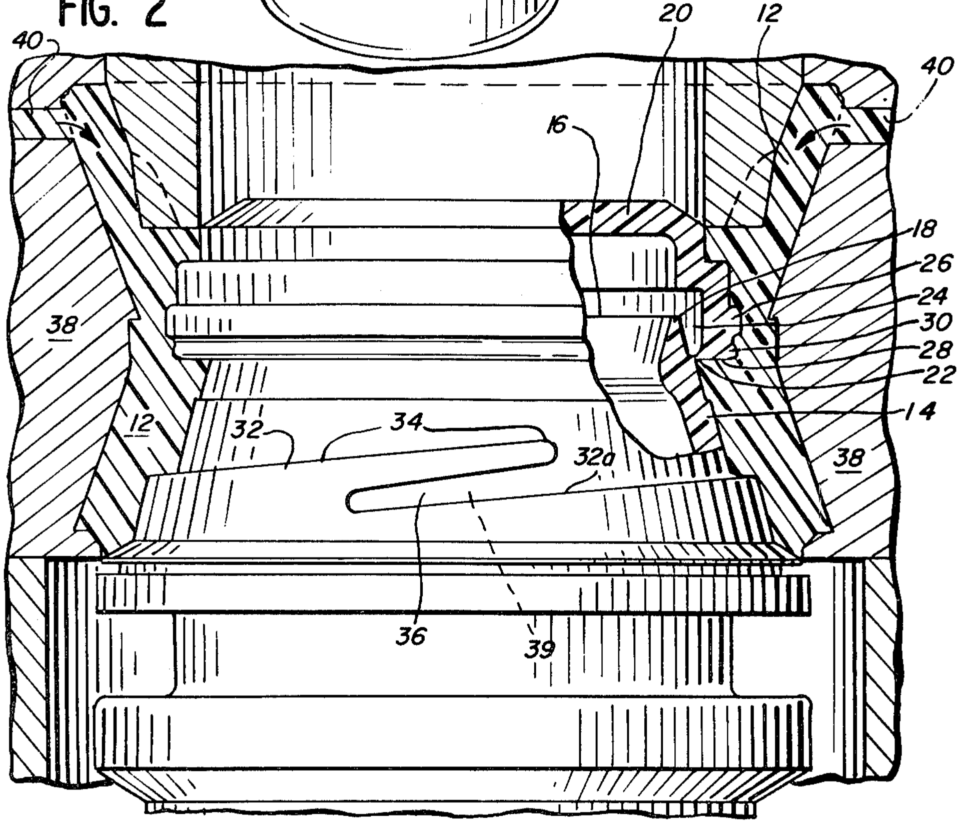
FIG. 2 is an elevational view, taken partly in section, of the top portion of a container in a mold for forming an annular antibacterial overmold which becomes the outer closure of this invention.

FIGS. 1 and 2 show a pour bottle 10, for containing sterile water, sterile saline solution, or the like. Bottle 10 defines neck 14, which carries sealed inner closure 20 (FIG. 2), which may be of plastic or metal. Outer closure 12 is an antibacterial, annular plastic overmold which surrounds a portion of neck 14.

Referring to FIG. 2, neck 14 defines a dispensing mouth or outlet 16 surrounded by annular pouring lip 18. Inner closure 20 covering outlet 16 is coupled to neck 14 at frangible section 22 below the plane of outlet 16. By coupling inner closure 20 to neck 14 in this manner, an annular channel 24 is defined between annular lip 18 and the inside of inner closure 20.

In FIG. 2, inner closure 20 is shown to have a bottom face 28 and an outwardly extending shoulder abutment 26. Inner closure 20 also has an outwardly projecting bead 30 above bottom face 28. Alternatively, inner closure 20 may have one or more spaced, outwardly projecting shoulder abutments or studs and/or a series of spaced outwardly projecting beads which function in a manner similar to anular abutment 26 and annular bead 30.

Figure 3:
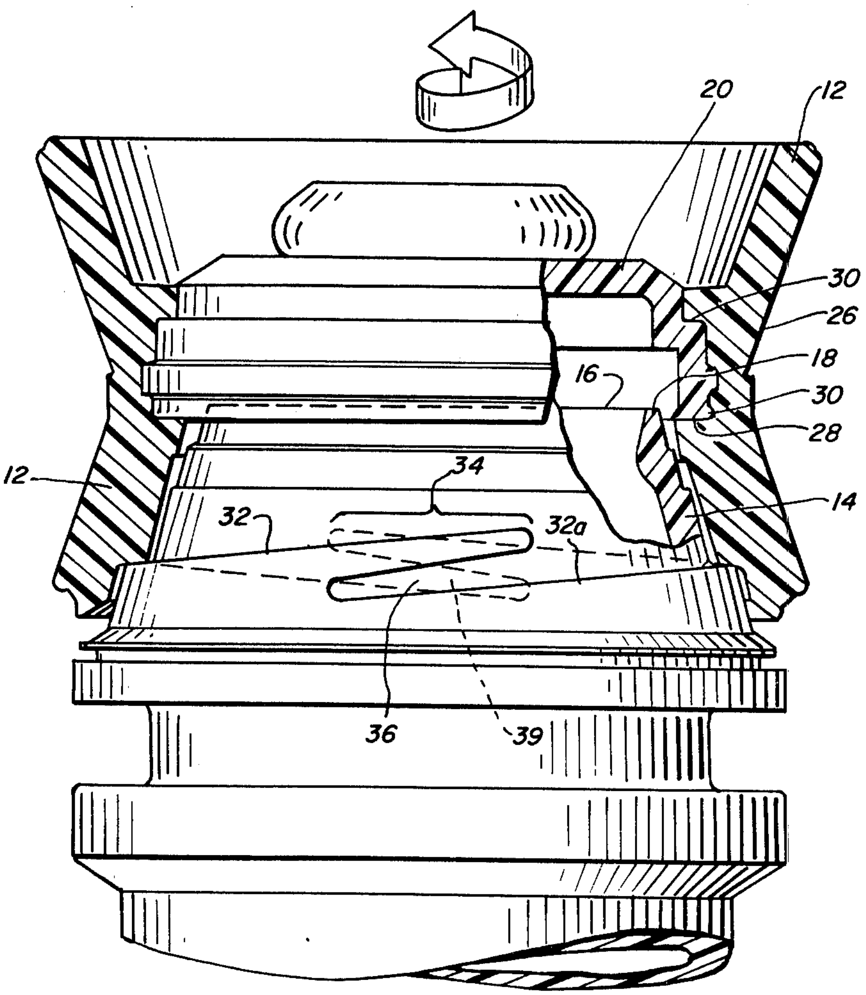
FIG. 3 is an elevational view, taken partly in section, showing the neck and inner closure portion of a container as the antibacterial outer closure and inner closure are being removed from the container.

Container neck 14 also defines a pair of helically inclined edges 32, 32*a* circumscribing the periphery of the neck 14. Helically inclined edges 32, 32*a* may be circumscribed on a cylindrical section of the neck 14 or on a conical neck section, as specifically shown. Two helically inclined edges 32, 32*a* as illustrated in FIGS. 2 and 3 define overlapping portions of edge sections 34.

The sealed container of this embodiment is constructed by first blow molding, by known technology, a container such as bottle 10 and defining the neck 14 having outlet 16 therein. The container is then filled with water, saline solution, or the like, preferably by a known sterile fill technique, followed by the molding of the inner closure 20 over outlet 16 to seal the container. Sealing the container in this fashion can also insure that the annular channel 24, and hence the outside of pouring lip 18, remain sterile.

The container in the illustrated embodiment is preferably made from any plastic, for example polypropylene, polyethylene, clear polyethylene terephthalate, rigid polyvinyl chloride, nylon and polyester.

Once the container 10 is filled and closed, it is inserted into mold 38 where a sealingly incompatible molten plastic in accordance with this invention is injected into mold 38 through ports 40 to form the outer closure 12. Neck 14 and inner closure 20 act as a mold core in mold 38. The term "sealingly incompatible" implies that the plastic does not adhere significantly to the bottle neck, so that when cool it may be rotated relative to the bottle neck.

Outer closure 12, covers neck 14 from helically inclined edges 32, 32*a* to at least outwardly extending bead 30 on inner closure 20, which it engages, and it optionally extends beyond to guard and protect inner closure 20. The molten plastic injected into die 38 is preferably hot enough (for example 180° to 440° F.) to cause the release of an antibacterial agent from plastic outer closure 12, whereby an antibacterial effect is exerted at the area of contact (juncture area) of outer closure 12 with neck 14 and inner closure 20, and yet is preferably not hot enough to cause major plastic deformation of neck 14 and inner closure 20. Alternatively, the antibacterial agent can be of the type to slowly leach out of the plastic of outer closure 12 over time during storage.

Several alternative embodiments of plastic outer closures which release an antibacterial agent to produce antibacterial effect in the juncture area are possible. Plastics for the outer closure may be impregnated with a germicide or antibacterial agent that is released by heat during the forming of the outer closure. Organic chlorinating agents from the group of N-chloramines, for example chlorinated triazines or chlorinated melamines or N-chloramides, may be compounded into the plastic of the outer closure. Inorganic chlorinating agents, for example calcium hypochlorite, may be used as well. Also, quaternary ammonium halides of known antiseptic value may be used. Organic peroxides such as benzoyl peroxide or dicumyl peroxide may be used, or silver compounds such as silver nitrate, silver chloride silver undecylenate, or silver sulfadiazine. With such silver compounds, the antibacterial agent released may also be a reaction product of the silver compound with the plastic matrix.

Preferred sealingly incompatible plastics for the outer closure which may be compounded with the germicide or antibacterial agent for example include polystyrene, ABS, polyvinyl chloride, or fluoropolymers such as polyvinylidene fluoride or Teflon® FEP (manufactured by E. I. du Pont de Nemours & Co.), when the container plastic is polypropylene or copolymers having a high polypropylene content.

Preferably, the outer closure may be made of polyacetals, for example Delrin®, an acetal homopolymer manufactured by E. I. du Pont de Nemours & Co., or an acetal copolymer, for example Celcon® manufactured by Celanese Corporation, both of which naturally release formaldehyde upon heating and can be injection molded to form an outer closure sealingly incompatible with a container made of polypropylene or a copolymer having a high polypropylene content. Formaldehyde enriched polyacetals, for example, an acetal homopolymer or an acetal copolymer enriched with paraformaldehyde can be used for the outer closure. Also, addition of catalysts such as ferric chloride in a polyacetal of its compounds will accelerate the generation of formaldehyde or allow release of formaldehyde at a lower temperature.

A powdered, high molecular weight polyacetal may be mixed with a plastic sealingly incompatible with the container and inner closure and for use as an antibacterial outer closure. A high molecular weight polyacetal powder disbursed in a low molecular weight plastic compound in low fractional percentages is particularly useful as a material for an outer closure when the container, inner closure or both are plastics with low melting temperatures. In this instance, formaldehyde would still be released by the powdered polyacetal, yet the higher molding temperatures for forming an outer closure of a polyacetal would be avoided.

By mixing polyacetals, for example Celcon® and Delrin® with other plastics, the release of formaldehyde from the plastic outer closure can be controlled and limited to low levels while still exerting antibacterial effect.

The plastic outer closure can release the antibacterial agent at different stages in the process, for example, with a polyacetal, the antibacterial agent is released by heating during molding. In the case of chlorinating agents mixed with the plastic, the release is slow and extended over a long period of time.

In addition, use of uncured polyurethane or epoxy resins for the outer closure and curing them in place tends to reduce the bio-burden at the area of contact of the container and inner closure with the outer closure, since such materials have a germicidal or antibacterial effect. For example reactive isocyanates used in epoxy and urethane resins are available before curing, producing an antibacterial effect at the contacting interface or juncture, but are no longer available when fully cured.

FIG. 3 shows annular outer closure 12 (made of a material described above) being rotated. Rotation of the outer closure 12 causes it to move axially outward, driven along helically inclined edges 32, 32*a*, causing rupture of frangible section 22. This permits removal of outer closure 12 and inner closure 20 from neck 14 of the container. As is shown outer closure 12 engages outwardly extending bead 30 and shoulder abutment 26 by contacting bottom face 28 of the inner closure 20 and preferably also extending thereabove. Thus, inner closure 20 can remain permanently engaged to outer closure 12. Upon molding of outer closure 12, projection member 39 is formed at its inner surface for retention of outer closure 12 on neck 14 in space 36 between the overlapping portions 34 of helically inclined edges 32, 32*a* circumscribing the periphery of neck 14. Projection member 39 withdraws from space 36 as outer closure 12 is rotated for opening, and allows a locking-type reclosure of the container by its reinsertion into space 36, as outer closure 12 is reapplied to the container neck.

Another embodiment of this invention contemplates using an outer closure to seal a pharmaceutical vial at the injection site inner closure providing an antibacterial injection site for access to the pharmaceuticals contained therein. The outer closure forms a juncture at the inner closure injection site and vial neck. An example of a closure seal on a pharmaceutical vial may be found in the application of Stephen Pearson for "Sterile Coupling" filed concurrently with this application and assigned to Baxter Travenol Laboratories, Inc. An antibacterial agent such as the organic chlorinating agents, organic peroxides or other agents with antibacterial effect previously described is compounded with the plastic for the outer closure, for example Kraton (a trademarked plastic manufactured by Shell Oil Company). It is believed that Kraton is a block copolymer of polystyrene and a rubbery polyolefin material. On hot molding the plastic outer closure, antibacterial agent is released effecting an antibacterial seal. A polyacetal, which releases formaldehyde on heating, may also be used to mold the outer closure and form an antibacterial seal at the juncture.

In still another embodiment, the plastic outer closure of the invention can be applied to seal the outside of a medical connection device having cooperating connector members. For example, where a solution container is coupled via tubing to another container. The plastic used for the outer closure can be plastic impregnated with one of described antibacterial agents or the plastic can be a polyacetal or have a powdered polyacetal mixed with it to release an antibacterial agent when heated. In this way, an antibacterial seal is effected at the juncture of the connection device and the plastic outer closure.

The above has been offered for illustrative purposes, and is not intended to limit the invention of this application, which is defined in the claims below.

What is claimed is:

1. The method of applying to a container having an inner closure, a plastic outer closure about the inner closure to define a sealed juncture area, the plastic of said outer closure being sealingly incompatible with said inner closure to permit said outer closure to be movable relative to said inner closure, the improvement comprising molding said plastic outer closure in place on the inner closure, said inner closure functioning as a mold core, and releasing an antibacterial agent from the plastic outer closure, whereby an antibacterial effect is exerted in said juncture area.

2. The method of claim 1 in which said antibacterial effect is exerted in said juncture area on heating said plastic of said outer closure.

3. The method of claim 1 wherein said antibacterial agent is a chlorinating agent.

4. The method of claim 1 wherein said antibacterial agent is a reaction product of silver nitrate with said plastic of said outer closure.

5. The method of claim 1 wherein said antibacterial agent is silver undecylenate.

6. The method of claim 1 wherein said antibacterial agent is a quaternary ammonium halide.

7. The method of claim 1 wherein said antibacterial effect is exerted in said juncture area when said antibacterial agent is released during the molding of said plastic of said outer closure.

8. The method of claim 7 wherein said antibacterial agent is an organic peroxide.

9. The method of claim 7 wherein plastic of the outer closure yields formaldehyde on heating, whereby an antibacterial effect is exerted in said juncture area during molding.

10. A method of applying to a container having a plastic inner closure a plastic outer closure about said inner closure, said plastic of said outer closure being sealingly incompatible with said plastic of said inner closure and said outer closure being movable relative to said inner closure, to define a sealed juncture area between the inner and outer closures, the improvement comprising molding said outer closure in place about the inner closure using the inner closure as a mold core, the material of the moled plastic outer closure comprising a plastic which yields formaldehyde on heating, and heating said plastic outer closure during the molding step, whereby an antibacterial effect is exerted in said juncture area.

11. The method of claims 9 or 10 wherein said plastic of said outer closure is a polyacetal.

12. The method of claims 9 or 10 wherein said plastic for said outer closure is a formaldehyde enriched polyacetal.

13. The method of applying to a connection device having cooperating connector members a plastic outer closure about said connector members to define a juncture area therebetween, the improvement comprising molding in place the plastic outer closure about said connector members, said connector members functioning as mold core means, and releasing an antibacterial agent from the plastic outer closure, whereby an antibacterial effect is exerted in said juncture area.

14. The method of claim 13 in which said antibacterial effect is exerted in said juncture area on heating said plastic of said outer closure during said molding.

15. The method of claim 13 wherein said antibacterial agent is a chlorinating agent.

16. The method of claim 13 wherein said antibacterial effect is provided to said plastic outer closure by using a plastic for said outer closure which yields formaldehyde on heating.

17. The method of claims 13 or 16 wherein said plastic for said outer closure is a polyacetal.

* * * * *